US 009524059B2

(12) United States Patent
Capps et al.

(10) Patent No.: US 9,524,059 B2
(45) Date of Patent: Dec. 20, 2016

(54) INTERACTION DETECTION USING STRUCTURED LIGHT IMAGES

(71) Applicant: Texas Instruments Incorporated, Dallas, TX (US)

(72) Inventors: Marshall Charles Capps, Farmers Branch, TX (US); Goksel Dedeoglu, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 296 days.

(21) Appl. No.: 13/834,807

(22) Filed: Mar. 15, 2013

(65) Prior Publication Data

US 2014/0267007 A1    Sep. 18, 2014

(51) Int. Cl.
| | | |
|---|---|---|
| *G06F 3/042* | (2006.01) | |
| *G06F 3/048* | (2013.01) | |
| *G06F 3/038* | (2013.01) | |
| *G06F 3/0354* | (2013.01) | |
| *G06F 3/041* | (2006.01) | |

(52) U.S. Cl.
CPC ............. *G06F 3/042* (2013.01); *G06F 3/0386* (2013.01); *G06F 3/03542* (2013.01); *G06F 3/048* (2013.01); *G06F 3/0418* (2013.01); *G06F 3/0426* (2013.01)

(58) Field of Classification Search
CPC ..... G06F 3/042; G06F 3/0386; G06F 3/03542
USPC .......... 345/156–158, 173, 178; 356/614–624
See application file for complete search history.

(56) References Cited

U.S. PATENT DOCUMENTS

| | | | | |
|---|---|---|---|---|
| 6,710,770 | B2 * | 3/2004 | Tomasi | G06F 1/1613 345/156 |
| 7,907,781 | B2 * | 3/2011 | Ivanov | G01B 11/24 382/154 |
| 2004/0239653 | A1 * | 12/2004 | Stuerzlinger | 345/183 |
| 2005/0099405 | A1 * | 5/2005 | Dietz et al. | 345/179 |
| 2007/0019166 | A1 * | 1/2007 | Iwasaki | 353/34 |
| 2008/0174704 | A1 * | 7/2008 | Tan et al. | 348/745 |
| 2010/0188333 | A1 * | 7/2010 | Capps | 345/157 |
| 2011/0119638 | A1 * | 5/2011 | Forutanpour | 715/863 |
| 2012/0162144 | A1 * | 6/2012 | Fahraeus et al. | 345/178 |
| 2012/0176343 | A1 * | 7/2012 | Holmgren et al. | 345/175 |
| 2012/0262423 | A1 * | 10/2012 | Su et al. | 345/175 |
| 2013/0155027 | A1 * | 6/2013 | Holmgren et al. | 345/175 |
| 2013/0257813 | A1 * | 10/2013 | Chang et al. | 345/175 |

* cited by examiner

*Primary Examiner* — Jonathan Horner
(74) *Attorney, Agent, or Firm* — Gregory J. Albin; Charles A. Brill; Frank D. Cimino

(57) ABSTRACT

An apparatus and method are provided to determine the occurrence and location of an interaction with an interface, particularly with an image of a user interface that may be projected or otherwise produced on a surface. The apparatus uses one or more single-element sensors (such as a photodiode) to sense and capture light readings of a scene, the readings corresponding to a plurality of structured light images injected within the presentation of the interface. The readings are compared to a baseline set of readings to determine the occurrence and location of an interaction event by an obstacle (i.e., a finger or a stylus) such as a touch event or a movement of the obstacle.

15 Claims, 6 Drawing Sheets

INTERACTION DETECTION USING STRUCTURED LIGHT IMAGES

TECHNICAL FIELD

This invention relates generally to the detection of interactions with an interface.

BACKGROUND

Interactions with an interface, such as human touch interaction with an image projected or otherwise displayed on a surface, can be detected by many means. Such previous methods of detecting interactions included digital cameras (e.g., charge-coupled device (CCD) cameras or CMOS cameras) that continuously capture images of a scene and continuously process the scene to determine the occurrence and location of an interaction with the interface. These solutions, however, require the use of one or more extra cameras and associated optics to monitor the scene, which can be an expensive addition and can be difficult to incorporate into a small form factor as may be needed for implementation in portable electronic devices such as mobile communication devices. Further, these solutions require a large amount of processing power to process the images of a scene and consume additional power to operate the camera and to process the data. Further still, camera-based solutions perform poorly under harsh ambient light conditions.

Other methods involve lasers or other distance measurement equipment to constantly measure distances of objects within the measurement field to determine if an interaction occurs. However, these solutions also require the extra components needed to effectuate the distance measurements, which can be costly, power hungry, and too large for use with smaller portable devices. Still other solutions use ultrasound technology or electro-magnetic sensing. However, these solutions do not provide accurate readings as to the location of an interaction.

Given the proliferation of mobile and wireless devices, a solution that provides accurate interaction detection while minimizing processing power, power consumption, and physical form factor is desirable.

SUMMARY

Generally speaking and pursuant to these various embodiments, an apparatus and method are provided to determine the occurrence and location of an interaction with an interface, particularly with an image of a user interface that may be projected or otherwise produced on a surface. The apparatus uses one or more single-element sensors (such as a photodiode) to sense and capture light readings of a scene, the readings corresponding to a plurality of structured light images injected within the presentation of the interface. The readings are compared to a baseline set of readings to determine the occurrence and location of an interaction event by an obstacle (i.e., a finger or a stylus) such as a touch event or a movement of the obstacle. These and other benefits may become clearer upon making a thorough review and study of the following detailed description.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Figure 1:
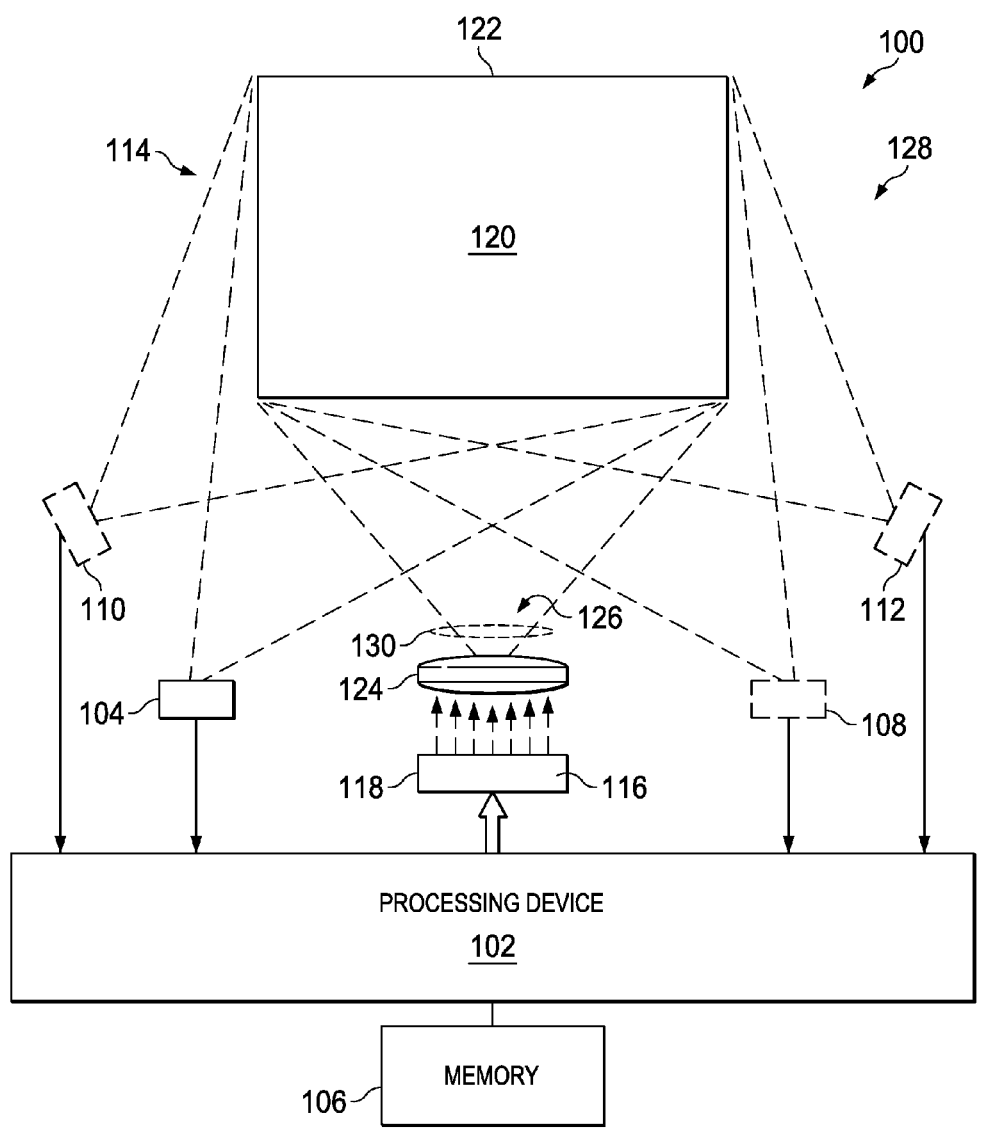
FIG. 1 illustrates a block diagram of an apparatus for sensing interactions with an interface in accordance with various approaches.

Referring first to FIG. 1, an apparatus 100 for sensing interactions with an interface is illustrated in block diagram form in accordance with various approaches. The apparatus 100 includes at least one processing device 102 and at least one single-element light sensor 104 coupled to the processing device 102. The processing device 102 may be coupled to or contain therein at least one memory device 106. The single-element sensor 104 may be a photodiode, a photo sensor, a photoelectric sensor, a photoswitch, a phototube, a phototransistor, a photon counter, a wavefront sensor, a single-pixel of an active pixel sensor, a photovoltaic sensor, or other known or currently unknown single-element light sensors. By some approaches, multiple single-element sensors may be used, such as sensors 104, 108, 110, 112. However, these multiple sensors 104, 108, 110, 112 are generally not co-located with one another and are provided to take readings of a scene 114 from different angles and viewpoints. The scene 114 is defined as the area that one or more of the single-element sensors 104, 108, 110, 112 can read. By another embodiment, the single-element sensors 104, 108, 110, 112 could be swapped for "few-element"

sensors, which may be comprised of a small number of element sensors (i.e., 2, 3, or even more) that are co-located, but not so many as would create unnecessary additional cost and power usage as compared to an improved signal received in a single captured reading. For example, a two-element sensor (with two sensor element co-located) could be used instead of a single-element sensor 104 simply to allow for additional light sensitivity by virtue of the increase sensing ability. However, the functionality described herein would not change due to the added sensitivity offered by added element sensor.

The apparatus 100 may also be coupled to an image generator 116. For example, as is illustrated in FIG. 1, the image generator 116 may be a projector 118, such as, for example, a DLP Pico ultra-short throw projector, though other projector 118 types may be suitable for use with the apparatus 100. The projector 118 generates an image 120 in an image area 122, which it projects through one or more optical elements 124 (i.e., lenses) through a projecting light output 126 onto a surface 128 within the scene 114 via projection path 130. The sensors 104, 108, 110, 112 are configured to sense the light level of the scene 114 by sensing the light from the projecting light output 126 that reflects off of the surface 128. The projected image 120 may take up less or more image area 122 than the entire scene 114, which may change dependent upon the distance of the surface 128 from the projector 118 and/or the sensors 104, 108, 110, 112. Typically, though not always, the surface 128 will be a flat surface such as a table or a wall, though these teachings are suited for use on any surface that is capable of having the image 120 displayed thereon. By another approach, the image generator 116 generates the image 120 on the surface 128 itself (such as by a graphical display) rather than by projected thereon.

Figure 2:
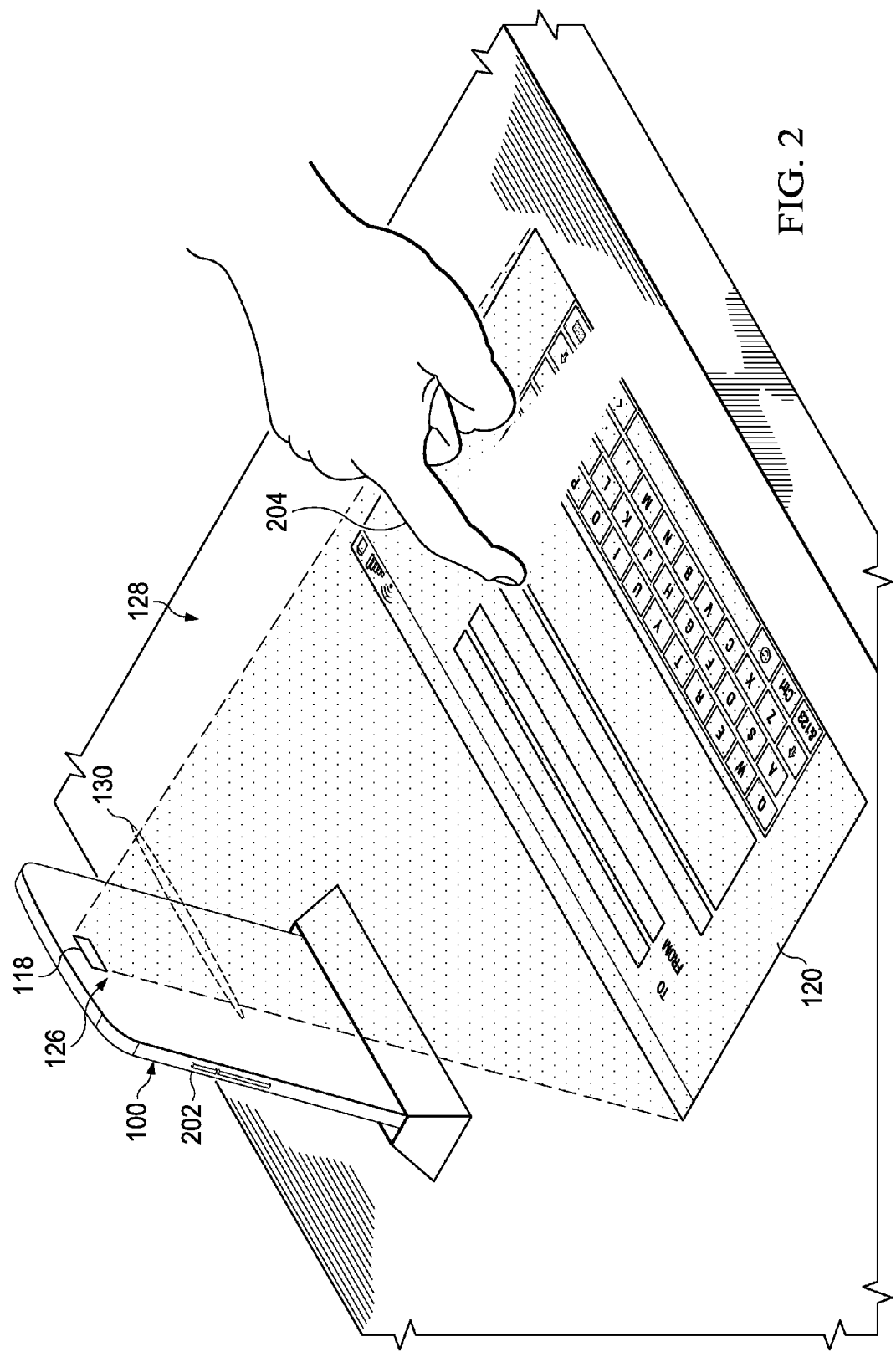
FIG. 2 is a contextual example of the use of the apparatus of FIG. 1.

A contextual example is provided in FIG. 2. As shown in FIG. 2, the apparatus 100 is a mobile device such as a cell phone 202. The cell phone 202 includes a projector 118 and is configured to project an image 120 that is suitable for human consumption and/or interaction onto a surface 128 (a table in this example). The cell phone 202 may be configured to stand upright or have a portion that remains elevated as compared to the surface 128 upon which it sits so that the user of the cell phone 202 may place it on the surface 128 and use his/her hands to interact with the image 120. As is shown here, the user can use an obstacle 204 (in this case, a finger) to interact with the image 120 in much the same manner as would the user of a touch-screen device (such as a tablet or the like). Such interaction is achieved by inserting the obstacle 204 or object (i.e., fingers) into the projection path 130, which interaction is subsequently sensed by the one or more sensors 104, 108, 110, 112, which are generally not co-located with the projector light output 126. Accordingly, the cell phone 202 can provide a much larger area with which the user can interact with the cell phone 202 than is possible with a display on the comparably small and portable form factor of the cell phone 202.

To effectuate spatial detection of interaction events (i.e., a touch) using only a handful of single-element sensors 104, 108, 110, 112, a plurality of time-varying structured light images 300 (see FIGS. 3-8) are individually projected or otherwise generated on the surface 128 in individual time slots. By one approach, these structured light images 300 are inserted in time in the projection of a non-structured light image 120 (such as the human consumable image 120 and/or the interface) using the same projector 118 that is used to project the non-structured light images 120.

By one example, the projector 118 can use fast switching display technology. The human eye can detect individual images when produced at a maximum of approximately 60-100 frames per second (fps). However, fast switching display projectors or other image generators 116 can generate images 120 at a frame rate higher than is detectable by humans and as high as 1,000 fps or even 10,000 fps. Thus, when such technology is utilized, the plurality of structured light images 300 can be inserted in time during the projection of the non-structured light images 120 while remaining undetectable by humans.

Figure 3:
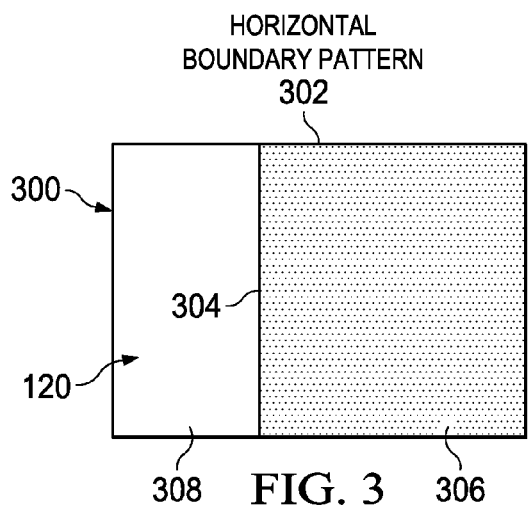
FIG. 3 illustrates an example horizontal boundary pattern structured light image as may be used by the apparatus of FIG. 1 in accordance with at least one approach.

Turning now to FIGS. 3-8, example structured light images 300 are illustrated in accordance with various approaches. FIG. 3 shows an example of a horizontal boundary pattern structured light image 302 as may be projected by the projector 118 in an individual time slot during the projection of other images 120. The horizontal boundary pattern 302 uses a vertical line to determine horizontal location information for the obstacle 204. As is shown here, the structured light image 300 has at least one high-contrast boundary 304 that is internal to its image area 122. This high contrast boundary 304 may, for example, be a straight line and may represent the boundary 304 between a dark region 306 (i.e., uniformly blacked-out) and a bright region 308 (i.e., uniformly illuminated). The high-contrast boundary 304 also corresponds to a geographical location of interest within the image 300 (i.e., the entire column proximate to the boundary 304). Other high-contrasting colors or shade combination are possible as well. In other examples, the structured light image 300 may have a sinusoidal or other gradient boundary between two contrasting areas 306, 308. By other examples, there may be multiple different areas of high contrasting light 306, 308, or multiple different shapes to the boundary or boundaries 304. The boundaries 304 may be straight (as shown in FIGS. 3-8) or may be curvy, may be horizontal or vertical, or span in a radial pattern. Almost any pattern or combination of patterns is possible such that the plurality of structured light images 300 allow for flat field encoding of the surface 128 according to the methods described in more detail below. The structured light images 300 discussed and illustrated herein are merely examples and are not meant to limit the scope of this disclosure in any way.

Figure 4:
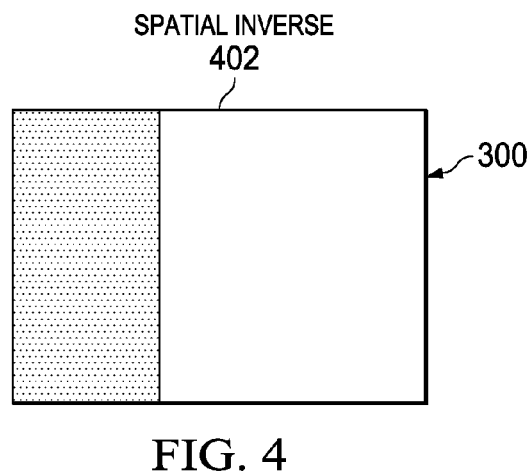
FIG. 4 illustrates the spatial inverse of the example horizontal boundary pattern structured light image of FIG. 3.

Continuing with FIG. 4, a spatial inverse 402 of the horizontal boundary pattern structured light image 302 of FIG. 3 is illustrated. By using this spatial inverse image 402, additional data may be gathered from the single-element sensors 104, 108, 110, 112. Further, even if the structured light images 300 are projected for such a quick time that they are not individually detectable, it may be possible for the human eye to at least detect a mass effect of a plurality of structured light images 300 being inserted into the projection stream. By projecting a structured light image, such as the horizontal boundary pattern 302 in FIG. 3, followed shortly after by its spatial inverse, such as the spatial inverse 402 in FIG. 4, the effect can be nullified because the structured light image 302 and its inverse 402 visually cancel each other.

Figure 5:
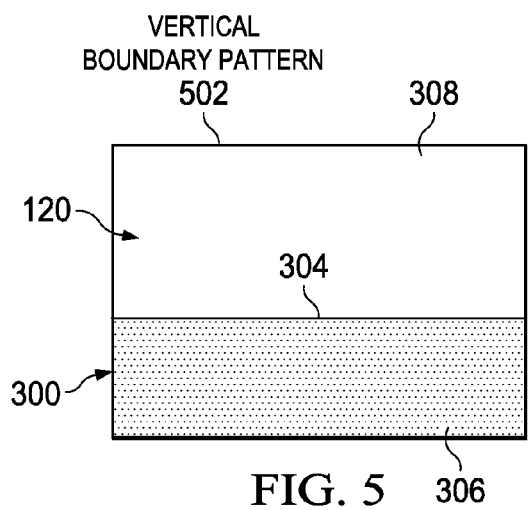
FIG. 5 illustrates an example vertical boundary pattern structured light image as may be used by the apparatus of FIG. 1 in accordance with at least one approach.
Figure 6:
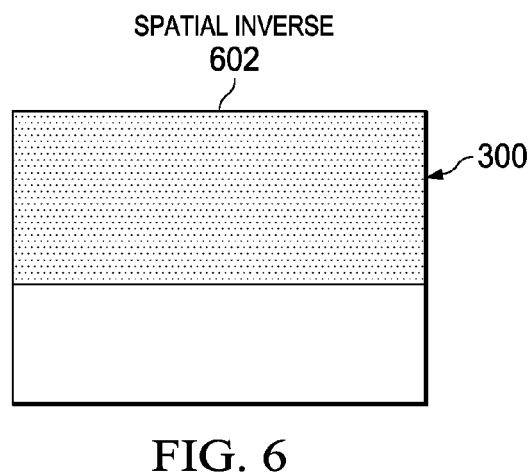
FIG. 6 illustrates the spatial inverse of the example vertical boundary pattern structured light image of FIG. 5.
Figure 7:
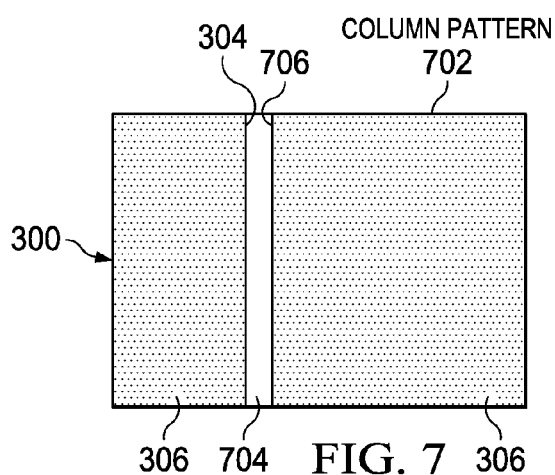
FIG. 7 illustrates an example column pattern structured light image as may be used by the apparatus of FIG. 1 in accordance with at least one approach.
Figure 8:
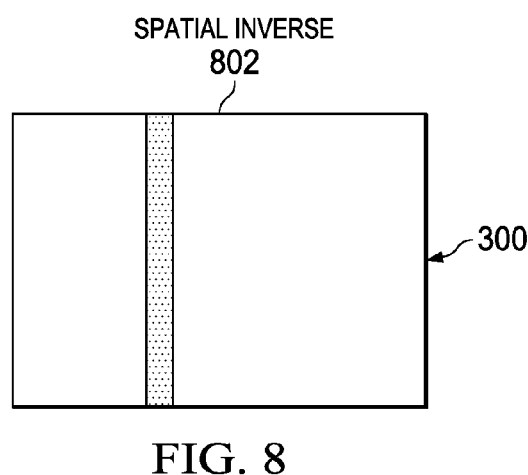
FIG. 8 illustrates the spatial inverse of the example column pattern structured light image of FIG. 7.

Other examples of structured light images 300 are illustrated in FIGS. 5-8. FIG. 5 illustrates a vertical boundary pattern structured light image 502, while FIG. 6 illustrates its inverse 602. FIG. 7 shows an example of a column pattern structured light image 702, while FIG. 8 shows its inverse 802. The stripe 704 of the column pattern 702 contains two high-contrast boundaries 304 and 706. The stripe 704 may be any width, such as a single pixel wide to hundreds of pixels wide. The column patterns 702, 802 of FIGS. 7 and 8 can also be modified such that the stripe 704 lies in a row pattern instead of a column.

A plurality of structured light images 300 will contain a set of unique structured light images 300 that differ from one another in the location of the high contrast boundary 304. Continuing with the column pattern structured light image 702 of FIG. 7, this image may be one of dozens, hundreds, or thousands of column pattern structured light images 702, where each image, for example, may differ in the placement of the stripe 704 from side-to-side. If the plurality of structured light images 300 in this example where projected one after the other (slow enough to perceive), it may appear as a stripe 704 of light scanning across the surface 128.

In another example, the vertical boundary pattern structured light image 502 of FIG. 5 may be but one of many images that differ from each other in the vertical placement of the high-contrast boundary 304 (i.e., from top-to-bottom). If the plurality of structured light images 300 in this example where projected one after the other (slow enough to perceive), it may appear as a growing portion of light that starts at the top and works its way down until it occupies the entire (or most of the) image area 122.

The projection sequence of individual structured light images 300 is in no way limited to scan from side to side or top to bottom. The order of projection can be such that the boundary or boundaries 304 can change in any suitable pattern as may be deemed appropriate in the given setting. For example, to avoid a scanning sensation as could possibly be detected by a user, the processing device 102 may project the structured light images 300 in a seemingly random order such that the high-contrast boundary 304 moves in a seemingly random manner, thus reducing the likelihood of detection by the user.

Additionally, the order of structured light images 300 to be projected, or even which plurality of structured light images 300 to project, can be selected on the fly by the processing device 102 according to any number of factors. For example, and as will become more clear upon continued reading, the processing device 102 may determine an approximate location of an interaction (or an area of interest) during a first time using a first plurality of structured light images 300, and then at a second time, use a second plurality of images 300 that contain boundaries that are proximate to that location or area to gather additional and/or more detailed information about what is occurring at that location.

The processing device 102 is configured to capture one or more sensor readings from the single-element sensors 104, 108, 110, 112 during projection of each structured light image 300. Each sensor reading is a detected light level at an individual single-element sensor 104, 108, 110, 112. Because each sensor 104, 108, 110, 112 has a single element or at least provides a single storable data point, the data amount for each reading is extremely small and is easily stored.

In operation, the processing device 102 characterizes the optical response of the sensors 104, 108, 110, 112 in response to different individual structured light images 300. For example, the processing device 102 will enable to the sensors 104, 108, 110, 112 to each take an individual reading during the projection of an individual structured light image 300 to create one or more sensor readings corresponding to that individual structured light image 300. Returning to the example column pattern structured light image 702 of FIG. 7, the processing device 102 can effectively "scan" the image area 122 by effecting projection of the column pattern 702 in a plurality of unique structured light images 300 that cover the image area 122. The processing device 102 may project the plurality of structured light images 704 such that the column strip 704 will exist at every location on the image 120 during projection of at least one structured light image 702. The individual structured light images 702 may vary the location of the column strip 704 by as little as one pixel, to as much as the width of the strip, or even further. As described above, the scan can be effectuated geographically sequentially (i.e., side-to-side) or in a seemingly random pattern that ultimately results in the desired coverage of the image area 122.

By another approach, the plurality of structured light images 300 may be selected such that the strip 704 exists proximate to every location of the image area 122, meaning there are gaps of coverage. These gaps may be of equal or unequal size, dependent upon the specific application. For example, the processing device 102 may only scan areas that the user is actually capable of interfacing with (i.e., images of buttons or a keyboard), leaving gaps where it is not interested or where no meaningful interaction can occur. Similarly, the processing device 102 may scan areas that receive the most interaction (i.e., the center) with a higher density (i.e., smaller gaps, no gaps, or a smaller change in the location of the strips 704) than in other areas (i.e., the edges). If there are gaps in coverage, the processing device 102 can interpolate the optical response of the scene 114 for those locations to generate a set of sensor readings that characterize the scene 114.

Although these example scans are described with respect to the example column pattern structured light image 702 of FIG. 7, these teachings are highly flexible and can accommodate any structured light pattern 300, such as those in FIGS. 3-6 and others described herein, which allow for sensing of an optical response with respect to specific areas (i.e., the locations of the high-contrast boundary or boundaries 304).

Figure 9:
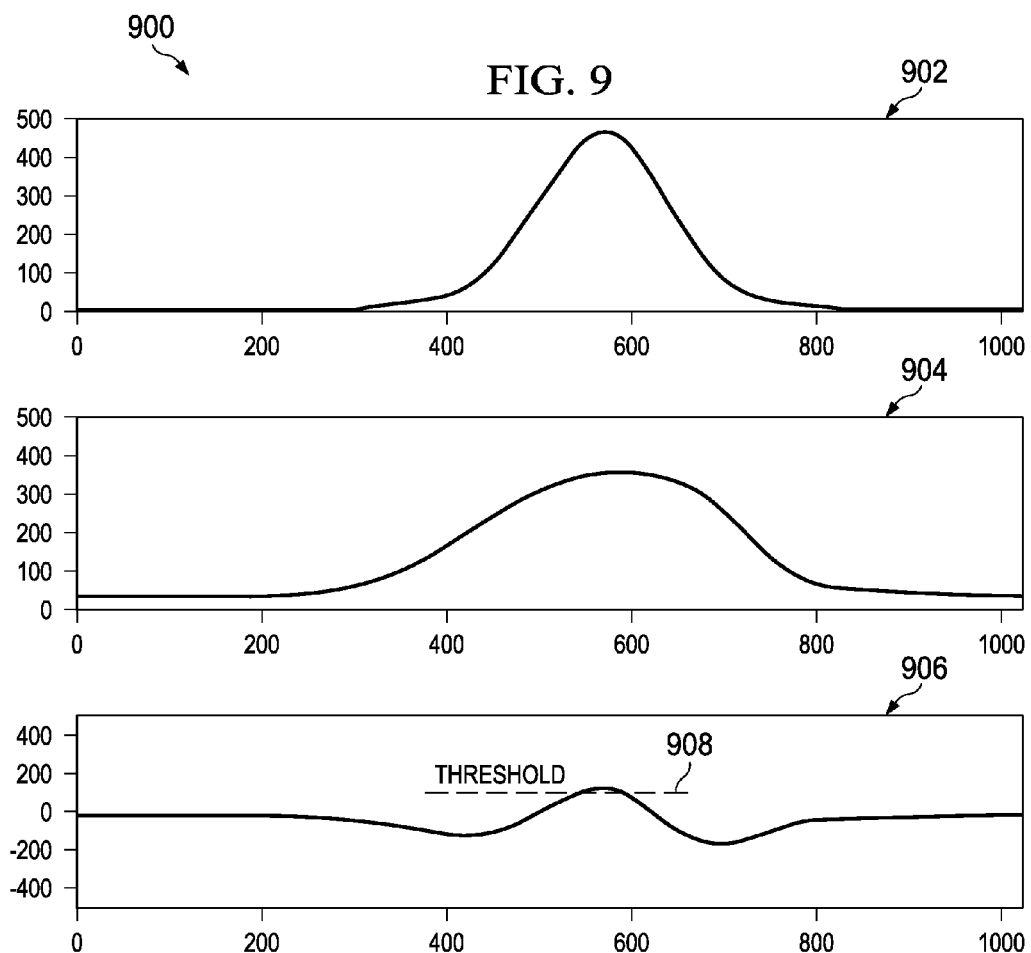
FIG. 9 illustrates an example representative graph of the characterization of a scene by the apparatus of FIG. 1.

FIG. 9 illustrates representative graphs 900 of the characterization of the scene 114, including plots of the optical response curves of a single-element sensor 104 across the plurality of structured light images 300 for which each optical response was captured. If the structured light images 300 are arranged in each graph 902, 904, 906 according to the geographical location of interest of each structured light image 300 (i.e., the location of the strip 704 or a high-contrast boundary 304), then each graph 902, 904 effectively becomes a measure of the optical response of the sensor 104 across a geographical area. Further, by one approach, if this geographical area of interest is altered in only one manner across the plurality of structured light images 300 (i.e., changing the location of the column strip in FIG. 7 only from side-to-side, or changing the location of the high-contrast boundary in FIG. 5 only from top to bottom), then the graphs 902, 904 effectively become a measure of the optical response of the sensor 104 across a single axis of the image area 122 (i.e., the x-axis or y-axis of the image area 122, or a radial axis of the image area 122, etc).

As is shown by graph 904, which represents a baseline reading of the scene 114, the scene 114 has been characterized as having the illustrated optical characterization curve using a particular set of structured light images 300. To generate this baseline set of sensor readings 904, the processing device 102 projects the plurality of time-varying structured light images 300 on the surface 128 in the absence of an interaction or obstacle 204. The processing device 102 then generates the plurality of sensor readings illustrated on graph 904 based on readings taken from the single-element sensor 104 (i.e., with a 1-to-1 correlation of graph data point to sensor reading or with interpolation using fewer actual sensor readings). These baseline sensor readings 904 can then be stored into the memory device 106 for use later. This may occur during initial start-up of the detection apparatus 100 to account for different surface or ambient light condition existing during each session. If the projector 118 is configured with fast switching capabilities, the baseline sensor readings 904 can be sensed and recorded very quickly, possibly quicker than a user can detect. Additionally, this baseline set of readings 904 can be continuously updated through specific re-calibration readings or though gradual alterations over time according to various factors, for example, an average of each reading for each structured light image 300 over time. By other approaches, these baseline sensor 904 readings may be preprogrammed, pre-configured, or pre-calibrated at the time of design, manufacture, test, calibration, or at other specific times during manufacture, sale, and setup of the apparatus 100.

After the baseline sensor readings 904 have been acquired and stored, the processing device 102 begins to take active readings 902 at which time the user is able to interact with the projected image 120 (for example, type on a projected keypad or manipulate a browser, etc). The processing device 102 will effect projection of a plurality of structured light images 300 (for example, the same as used to generate the baseline sensor readings 904, or possibly different structured light images 300) inserted in time during projection of the non-structured light image 120. Like before, the processing device 102 will also enable the sensor 104 to take individual sensor readings when each individual structured light image 300 is projected to generate a plurality of active sensor readings 902 corresponding to each structured light image 300. These readings 902, or a portion thereof, may be stored in the memory device 106. This process of capturing active data 902 can occur continuously and/or repetitively to continuously monitor the scene 114 to search for interactions.

Continuing with FIG. 9, the graph 902 represents an example set of active sensor readings that were captured during a short period of time and represent a snapshot of the scene 114 at that time. The readings of graph 902 correspond to the same structured light images 300 that the readings of graph 904 correspond to. However, again, the readings of graph 902 may be generated (i.e., interpolated) and do not necessarily represent a 1-to-1 relationship with actual measurements of actual structured light images 300. As is illustrated in FIG. 9, the graphs 902 and 904 look different than each other. This is because, in this example, an obstacle 204 (i.e., a finger) is being inserted into the projection path 130 of the projector 118 to cause an interaction.

The processing device 102 is configured to compare at least a portion of the active sensor readings 902 with at least a portion of the baseline sensor readings 904 that correspond to the same structured light images 300. The graph 906 represents this comparison, which is a calculated difference between the two graphs 902 and 904. Based on this comparison, the processing device 102 is configured to detect the interaction.

By one approach, to determine the occurrence of an interaction, the processing device 102 analyzes the difference graph 906. The analysis may include determining that the difference between one or more active 902 and baseline 904 sensor readings exceeds a threshold 908. For example, as is shown in graph 906, a portion of the calculated difference between the active 902 and baseline 904 readings exceeds a threshold 908 (which may be a positive or negative threshold). By this approach, the processing device 102 can determine that an interaction has occurred at that location.

By another approach, the processing device 102 is configured to use a convolution filter (or matched filter) having a waveform shape that is indicative of an interaction event when using a particular set of structured light images 300 to determine the location of an interaction. For example, the convolution filter may be a square notch waveform that is the approximate width of a finger. Alternatively, it may be similar to a pulse waveform that would be generated by a finger intercepting the projection of a particular set of structured light images 300. Such a pulse waveform may be, for example, similar to the pulse waveform generated in the difference curve 906 for that particular set of structured light images 906. The processing device 102 can then run this convolution pulse waveform over the difference curve 906 to search for a location where the two waveforms (the convolution pulse waveform and the difference curve 906) correlate the most. This location then marks the location of the interaction. Using a convolution filter approach not only takes into account the raw amplitude of the difference signal 906, but also the shape of the resulting difference waveform which the processing device 102 can search for. This results in a more robust indication of the location of the interaction.

By these teachings, the processing device 102 can be configured to search for known shapes within the difference curve 906 that correspond to a known specific type of interaction (i.e., a touch event) or an interaction by a specific obstacle 204 (i.e. a finger or stylus). These known shapes will change dependent upon the set of structured light images 300 used and the interaction type, but the process will remain largely unchanged. The known waveforms may be programmed at design or manufacture time, or may be created and/or modified over time during use of the device 100 (i.e., learned by the device).

For example, if one assumes that the example set of graphs 900 of FIG. 9 corresponds to a set of structured light images 300 that is specifically configured to detect interferences along the x-axis of the image area 122 (i.e., by using the column pattern structured light images 702 of FIG. 7 or the horizontal boundary pattern structured light images 302 of FIG. 3), the determined location of the interaction then corresponds to a location in the x-axis. By one approach, to determine the location within the two-dimensional image area 122, a similar process can be conducted to determine the y-axis location (either simultaneously or sequentially after the x-axis determination). For example, a set of structured light images 300 can be selected and projected that contain horizontal areas of interest so as to determine a vertical location of interaction such as the vertical boundary pattern structured light images 502 of FIG. 5 or a row pattern perpendicular to the column pattern 702 of FIG. 7. After the y-axis location is determined, that information can be combined with the x-axis location information to determine the two-dimensional location of the interaction within the image area 122. The processing device 102, or another processing device 102, can then use the two-dimensional interaction location information to determine an appropriate responsive action (i.e., open a program corresponding to an icon at that location, actuate a key of a projected keyboard, select a piece of text to be moved, etc). Essentially, any function capable of being performed on a touch interface can be performed using the methods described herein.

Figure 10:
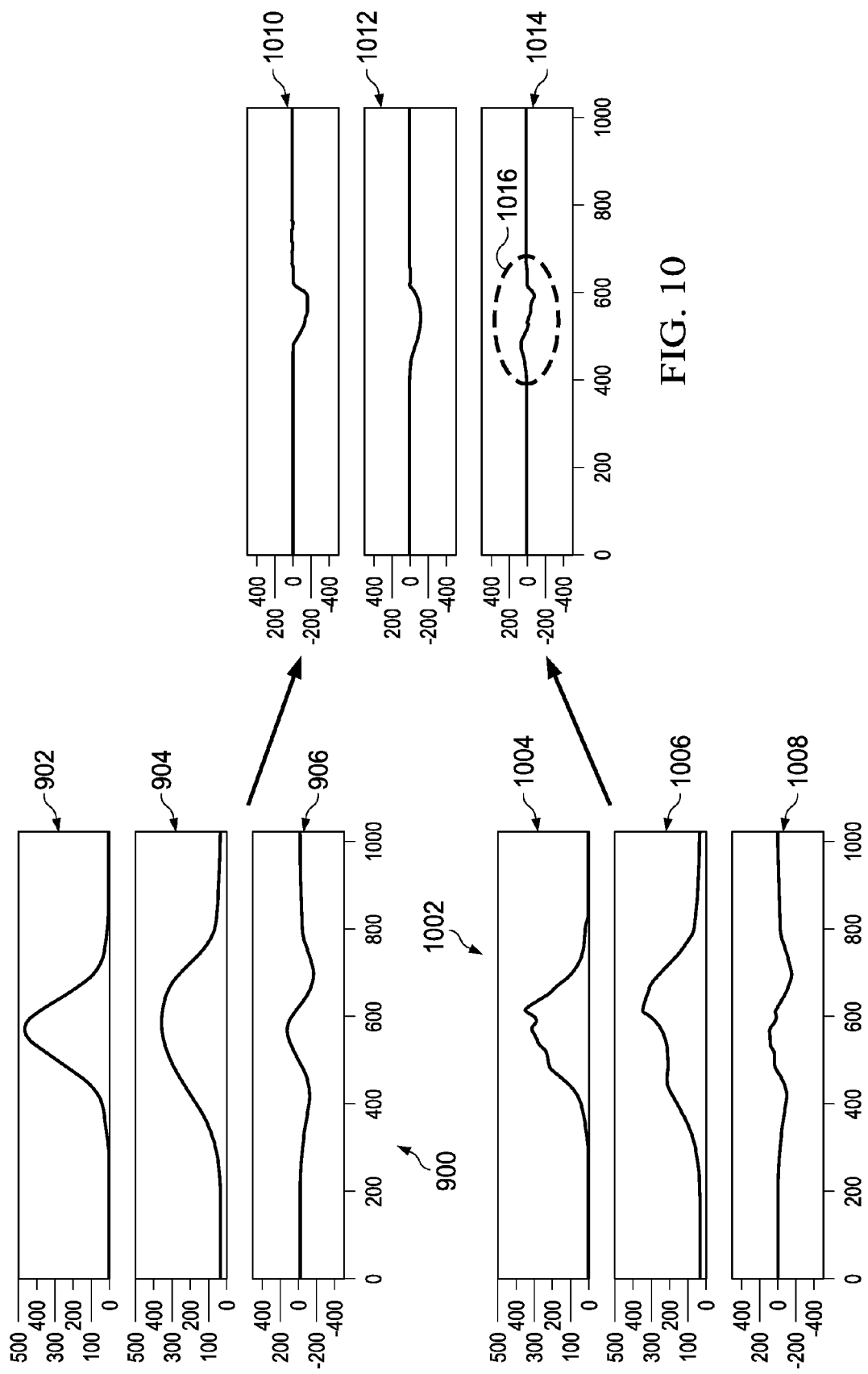
FIG. 10 illustrates example representative graphs using multiple single-element sensors in accordance with various approaches.

Turning now to FIG. 10, an example of using multiple single-element sensors 104, 108 is illustrated. In this example, the collection of graphs 900 is reproduced from FIG. 9 and correlates to sensor readings taken by a first single element sensor 104. The collection of graphs 1002 represents the sensor readings taken by a second single-element sensor 108 not co-located with the first 104 and corresponding to the same set of structured light images 300 as the first collection of graphs 900 for the first sensor 104. As shown here, the second sensor 108 has produced a different set of readings 1002 (both active 1004 and baseline 1006 readings). This represents additional data which the processing device 102 can use to better determine the location of an interaction.

In operation, by one approach, the processing device 102 will calculate the difference between the two active readings 902 and 1004, as is illustrated in plot 1010. The processing device 102 will also calculate the difference between the baseline readings 904 and 1006, as is illustrated in plot 1012. The processing device 102 can then calculate the difference between the two difference plots 1010 and 1012 to determine a third difference plot 1014. Alternatively, the processing device 102 can simply determine the difference of plots 906 and 1008 to generate the third difference plot 1014. Based on this third difference plot 1014, which takes into account the additional data provided by the second sensor 108, the processing device 102 can identify the interaction event and its location (as shown by circle 1016) with more accuracy and robustness.

Also, by using multiple sensors 104, 108, 110, 112, particularly if they are primarily visually fixed on different areas, the sensors 104, 108, 110, 112 can determine addition data than simply the x and y location of the interaction with more ease. For example, and with continuing reference to FIG. 10, if the second sensor 108 is situated such that its Field of View (FOV) volume is limited to an area just above the plane of touch events, then its data can be used to help determine if an obstacle 204 is merely elevated or hovering above the touch plane, or if the obstacle 204 has penetrated the touch plane, thus indicating a touch event. The added data provided by the second data 1004, 1006, and/or 1008 will be useful in making such determinations. For example, the third difference plot 1016 may result in a different wave form for the same x and y location dependent upon whether the obstacle 204 has broken the touch plane or is hovering above it, thus indicating the different functions.

Figure 11:
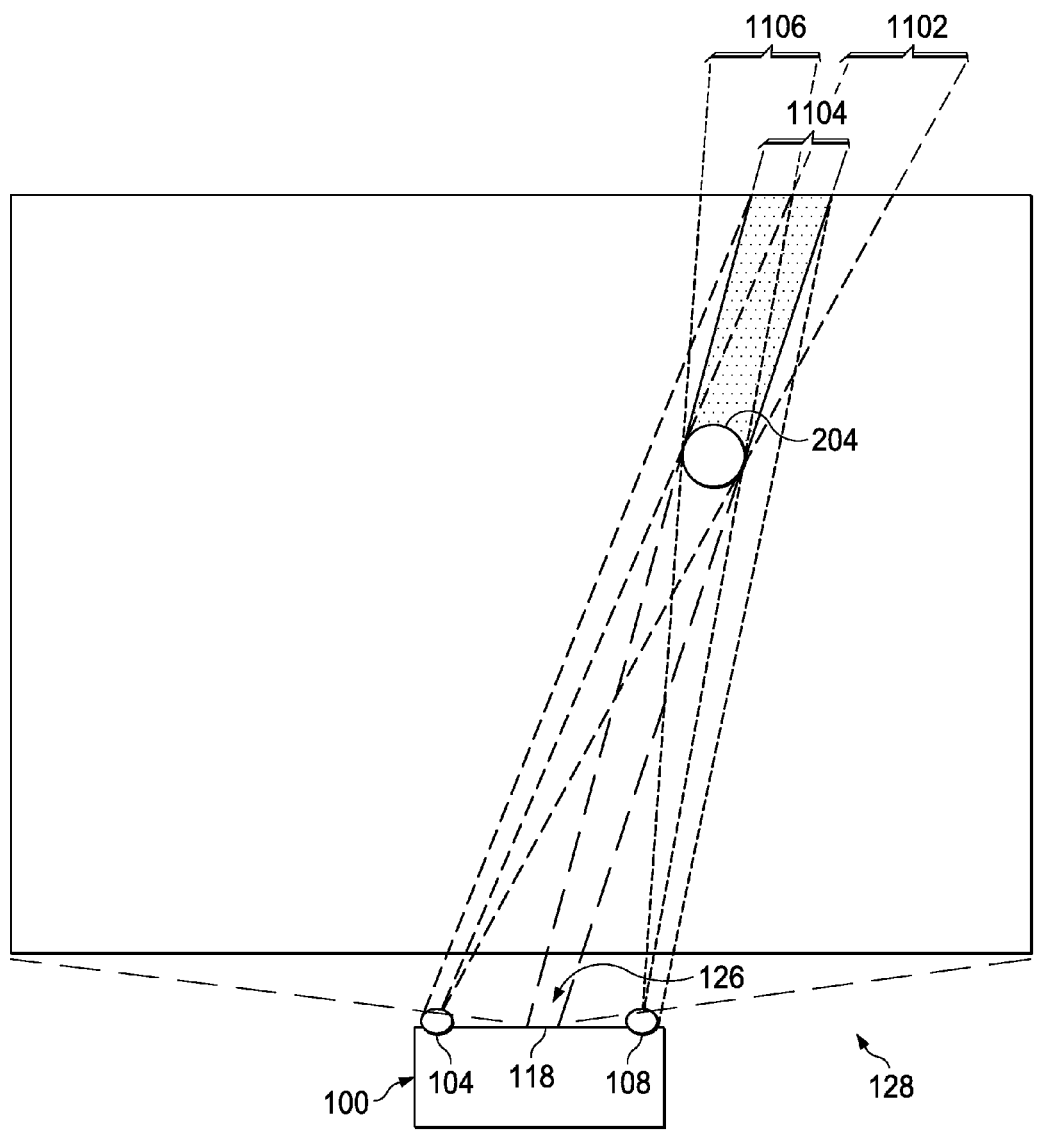
FIG. 11 illustrates further aspects of light detection by the apparatus of FIG. 1 in accordance with various approaches.

Further still, with the sensors 104, 108, 110, 112 being in a different physical location than the projection light source, there are multiple different aspects of an interaction which each sensor 104, 108, 110, 112 can read, as is illustrated in FIG. 11. FIG. 11 shows the projector projecting the image 120 through the projecting light output 126 onto the surface 128, like in FIG. 1. There are also two sensors 104, 108 that are not co-located with the projecting light output 126 as well as an obstacle 204 being inserted into the projection path 130. The obstacle 204 can produce different kinds of disturbances that may be detectable by the sensors 104, 108 during the projection of the structured light images 300. First, the sensors 104, 108 may be able to detect an amplification or attenuation of the reflection of the light off of the obstacle 204 rather than the surface 128. This is largely dependent upon the reflectivity of the obstacle 204 and/or the angle of reflection, but is a disturbance nonetheless. The obstacle 204 may also displace the structured light images that the sensors 104, 108 may detect. For example, the first sensor 104 may expect to sense a specific portion of the structured light images 300 as is indicated at 1102. However, from the point of view of the first sensor 104, this portion 1102 of the images will be replaced by a portion of the images corresponding to area portion 1104 that is reflecting off of the obstacle 204, which the processing device can register as a displacement disturbance. Additionally, the sensor 104 may also be able to detect an occlusion of the projected structured light images 300 by the obstacle 204. This occlusion is represented by area 1106, which the first sensor 104 could detect as void of reflected light where it would otherwise expect reflected light to exist. Based on detecting these various different kinds of disturbances, the processing device 102 can determine more about the nature of the interaction to enable further functionality or accuracy.

As mentioned before, the selection of the sets of structured light images 300 can be determined dynamically in real time. For example, if a scene 114 was void of an interaction, the processing device 102 may simply continue with broad scans of the entire image area 122 searching for an interaction. When an obstacle 204 finally does enter the projection path 130 or otherwise attempt to interact with the image 120, then the broad scans will determine its occurrence and approximate location. According to one approach, the processing device 102 may then dynamically select a second set of structured light images 300 that are focused primarily on the area surrounding the location determined in the broad scan. This second set of structured light images 300 may be selected such that high-contrast boundaries 304 or stripes 704 of the images 300 are proximate to the approximate location of the interaction. The processing device 102 can then repeat the procedures described above with respect to the newly selected second set of structured light images 300.

Accordingly, the second set of structured light images 300 allows for additional information to be determined about the interaction like, for example, more accurate location information or information regarding whether the obstacle 204 has broken the touch plane or is hovering thereabove. Further, the second set of structured light images 300 can be ever-changing as, for example, the obstacle 204 moves within the image area 122 (such as when interacting with the image 120 to move an icon or the like), a second obstacle 204 is detected, the orientation of the obstacle 204 changes, or any other alteration that would warrant additional or more detailed information.

These teachings are highly scalable and can be used to determine the location of 1, 2, 3, or more interactions (i.e., by one, two, three, or more obstacles 204). Further, other modifications may include the use of modulated light, where one or more structured light patterns or images 300 could be modulated at appropriate frequencies and the sensors 104, 108, 110, 112 could be configured to capture the time of flight of the modulated light rays. This time of flight data can then be used to further improve the robustness of the interaction event detection and tracking. Also, as discussed above, these teachings are versatile in that they are usable with all kinds of display devices that are capable of producing both human consumable images 120 and the structured light images 300, including direct view display devices (i.e., LCD displays).

So configured, a projector 118 or other image generator 116 can be utilized not only for projecting images 120 for human consumption and interaction, but also as a means to allow one or more single-element sensors 104, 108, 110, 112 to be utilized to detect the location(s) and nature(s) of interactions with the image 120 by one or more obstacles 204. A cost savings can be realized in that a system which is already outfitted with a projector 118 or image generator 116 can simply use the existing projector 118 or image generator 116 to project or otherwise display the structured light images 300. Further, single-element sensors 104, 108, 110, 112 can be significantly less expensive than pixel arrays or other previous sensing means discussed above. Moreover, by reusing the existing projector 118 or image generator 116 to also display the structured light images 300, the location information gathered is automatically linked to their location within the human consumable images 120. Further still, these teachings present a power savings and space savings as the single-element sensors 104, 108, 110, 112 consume less power and take up less space than other known techniques and/or devices. Moreover, the single-element sensors 104, 108, 110, 112 create less data which reduces required processing time and power.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A method comprising:
    sensing, using at least one photodiode, a plurality of time-varying structured light images individually projected on a surface in individual time slots to generate a plurality of sensor readings, in which individual ones of the sensor readings correspond to individual ones of the plurality of time-varying structured light images, each of the plurality of time-varying structured light images including at least one high-contrast boundary internal to an image area of the respective time-varying structured light image, the plurality of time-varying structured light images differing one from another in location of the at least one high-contrast boundary;
    comparing, using at least one processing device, at least a portion of the plurality of sensor readings with at least a portion of a plurality of baseline sensor readings, the at least a portion of the plurality of sensor readings and the at least a portion of the plurality of baseline sensor readings corresponding to a same set of the plurality of time-varying structured light images that are projected on the surface; and
    determining, using the at least one processing device, an occurrence of and an approximate location of an object being inserted into a projection path of the plurality of time-varying structured light images projected on to the surface based on the comparing and based on a location of a high-contrast boundary in at least one of the time-varying structured light images.

2. The method of claim 1 in which the method further includes:
    sensing, using the at least one photodiode, the plurality of time-varying structured light images projected on the surface in individual time slots in the absence of the object being inserted into the projection path to generate the plurality of baseline sensor readings, individual ones of the plurality of baseline sensor readings corresponding to individual ones of the plurality of time-varying structured light images; and
    storing the plurality of baseline sensor readings in at least one memory device.

3. The method of claim 1 in which the at least one high-contrast boundary includes at least one straight line defining at least two regions including a first region including a uniform bright area and a second region including a uniform dark area.

4. The method of claim 1 in which the at least one high-contrast boundary includes at least one of a vertical straight line or a horizontal straight line spanning at least a majority of the image area.

5. The method of claim 1 in which the method further includes:
    sensing at a second time, using the at least one photodiode, a second plurality of time-varying structured light images to generate a second plurality of sensor readings in response to determining the approximate location of the object, individual ones of the second plurality of sensor readings corresponding to individual ones of the second plurality of time-varying structured light images, in which the second plurality of time-varying structured light images includes at least a plurality of individual structured light images each including at least one high-contrast boundary proximate to the approximate location of the object;
    comparing, using the at least one processing device, the second plurality of sensor readings with a second plurality of baseline sensor readings, individual ones of the second plurality of baseline sensor readings corresponding to individual ones of the second plurality of sensor readings; and
    determining, using the at least one processing device, additional information regarding the object based on the second comparing.

6. The method of claim 1 in which determining the occurrence of and approximate location of the object being inserted into the projection path further includes analyzing the comparison between at least one individual sensor reading of the at least a portion of the plurality of sensor readings and at least one individual baseline sensor reading of the at least a portion of the plurality of the plurality of baseline sensor readings, in which the at least one individual sensor reading and the at least one individual baseline sensor reading each correspond to the same at least one individual time-varying structured light image, the analyzing including determining that a difference between the at least one individual sensor reading and the at least one individual baseline sensor reading exceeds a threshold.

7. The method of claim 1 in which determining the occurrence of and approximate location of the object being inserted into the projection path includes:
    determining that a difference between at least one individual sensor reading and at least one individual baseline sensor reading exceeds a threshold, the at least one individual sensor reading and the at least one individual baseline sensor reading corresponding to the same at least one individual structured light image; and
    determining the location of the high-contrast boundary in the at least one individual structured light image; and
    determining the approximate location of the object based on the location of the high-contrast boundary.

8. The method of claim 1 in which the plurality of time-varying structured light images are individually projected on the surface in individual time slots during a projection of a non-structured light image, the plurality of time-varying structured light images being projected by a same projector utilized to project the non-structured light image.

9. An apparatus comprising:
    at least one processing device configured to:
        effect projection of a plurality of time-varying structured light images on a surface in individual time slots inserted during projection of a non-structured light image via a same projector used to project the non-structured light image, each of the plurality of time-varying structured light images including at least one high-contrast boundary internal to an image area of the respective time-varying structured light image, the plurality of time-varying structured light images differing one from another in location of the at least one high-contrast boundary;

compare a plurality of sensor readings from at least one photodiode with a corresponding plurality of baseline sensor readings, individual ones of the plurality of sensor readings and the plurality of baseline sensor readings each corresponding to individual ones of the plurality of time-varying structured light images that are projected on the surface; and determine an occurrence of an object being inserted into a projection path at an approximate location based on the comparing and based on a location of a high-contrast boundary in at least one of the time-varying structured light images.

10. The apparatus of claim 9 in which the at least one processing device is further configured to:

effect projection of the plurality of time-varying structured light images on the surface in the absence of the object being inserted into the projection path;

generate the plurality of baseline sensor readings based on readings taken via the at least one photodiode of the projection of the plurality of time-varying structured light images in the absence of the object being inserted into the projection path, individual ones of the plurality of baseline sensor readings corresponding to individual ones of the plurality of time-varying structured light images; and effect storage of the plurality of baseline sensor readings into at least one memory device.

11. The apparatus of claim 9 in which the apparatus further includes the projector operatively connected to the at least one processing device and the at least one photodiode operatively connected to the at least one processing device and not co-located with a projecting light output of the projector.

12. The apparatus of claim 11 in which the at least one photodiode includes at least a first photodiode and a second photodiode that are not co-located with each other or the projecting light output of the projector and are configured to sense light from the projecting light output reflected off of the surface.

13. A method comprising:

projecting at a first time via a projector onto a surface in the absence of an interaction a plurality of time-varying structured light images, individual ones of the plurality of time-varying structured light images being projected in individual time slots and including at least one high-contrast boundary internal to the projection area of the projector, the plurality of time-varying structured light images differing one from another in location of the at least one high-contrast boundary;

sensing, using at least two individual photodiodes, the plurality of time-varying structured light images projected at the first time to generate a plurality of baseline sensor readings, individual ones of the plurality of baseline sensor readings corresponding to individual ones of the plurality of time-varying structured light images;

storing the plurality of baseline sensor readings in at least one memory device;

projecting at a second time via the projector the plurality of time-varying structured light images, individual ones of the plurality of time-varying structured light images being projected in individual time slots inserted during projection of a non-structured light image;

sensing, using the at least two photodiodes, the plurality of time-varying structured light images projected at the second time to generate a plurality of sensor readings, individual ones of the plurality of sensor readings corresponding to individual ones of the plurality of time-varying structured light images;

storing the plurality of sensor readings in the at least one memory device;

comparing, using at least one processing device, at least a portion of the stored plurality of sensor readings with at least a portion of the stored plurality of baseline sensor readings, the at least a portion of the plurality of sensor readings and the at least a portion of the stored plurality of baseline sensor readings corresponding to a same set of time-varying structured light images that are projected on the surface; and determining, using the at least one processing device, an approximate location of an object being inserted into a projection path based on a location of a high-contrast boundary in at least one of the time-varying structured light images.

14. The method of claim 13 in which the plurality of time-varying structured light images is configured such that the at least one high-contrast boundary exists proximate to locations of at least a majority of the projection area.

15. The method of claim 14 in which the method further includes:

projecting at a third time via the projector a second plurality of time-varying structured light images, individual ones of the second plurality of time-varying structured light images being projected in individual time slots inserted during projection of a non-structured light image and being configured such that at least one high-contrast boundary exists proximate to the approximate location of the object;

sensing, using the at least two photodiodes, the second plurality of time-varying structured light images projected at the third time to generate a second plurality of sensor readings, individual ones of the second plurality of sensor readings corresponding to individual ones of the second plurality of time-varying structured light images;

storing the second plurality of sensor readings in the at least one memory device;

comparing, using the at least one processing device, the stored second plurality of sensor readings with a second plurality of baseline sensor readings, individual ones of the second plurality of baseline sensor readings corresponding to individual ones of the second plurality of sensor readings; and determining, using the at least one processing device, additional information regarding the object based on the second comparing.

* * * * *